(12) United States Patent
Brown et al.

(10) Patent No.: US 8,109,705 B1
(45) Date of Patent: *Feb. 7, 2012

(54) TWIST-LOCK ANCHORING FASTENER (75) Inventors: Brian A. Brown, Alamo, CA (US);
Gregory A. M. Brown, Lafayette, CA (US)

(73) Assignee: Illinois Tool Works Inc., Glenview, IL (US)

( * ) Notice: Subject to any disclaimer, the term of this patent is extended or adjusted under 35 U.S.C. 154(b) by 731 days.

This patent is subject to a terminal disclaimer.

(21) Appl. No.: 11/678,459

(22) Filed: Feb. 23, 2007

(51) Int. Cl.
F16B 13/10 (2006.01)
F16B 45/00 (2006.01)

(52) U.S. Cl. .......... 411/344; 411/401; 411/30; 248/304

(58) Field of Classification Search .......... 411/41, 411/45, 48, 60, 349, 30, 344, 400, 401; 248/220.31, 248/304
See application file for complete search history.

(56) References Cited

U.S. PATENT DOCUMENTS

| 342,194 | A | * | 5/1886 | Finnegan | 248/222.52 |
| 423,730 | A | * | 3/1890 | Charlton | 248/222.52 |
| 492,418 | A | | 2/1893 | McClintock | |
| 638,384 | A | | 12/1899 | Dyer | |
| 868,353 | A | | 10/1907 | Martin, Jr. | |
| 974,391 | A | | 11/1910 | Jossart | |
| 977,795 | A | | 12/1910 | Gronke et al. | |
| RE13,204 | E | | 2/1911 | Jossart | |
| 1,051,893 | A | | 2/1913 | Joseph | |
| 1,236,293 | A | | 8/1917 | Grosser | |
| 1,452,514 | A | | 4/1923 | Karitzky | |
| 2,266,892 | A | * | 12/1941 | Mullen | 411/386 |
| 2,916,235 | A | | 12/1959 | Nagel | |
| 3,188,905 | A | | 6/1965 | Millet | |
| 3,213,745 | A | | 10/1965 | Dwyer | |
| 3,272,061 | A | * | 9/1966 | Seckerson | 411/15 |
| 3,406,431 | A | * | 10/1968 | Armstrong et al. | 24/607 |
| 3,431,813 | A | | 3/1969 | Johnson | |
| 3,550,499 | A | | 12/1970 | Ellenberger | |

(Continued)

FOREIGN PATENT DOCUMENTS

DE 202005011883 U1 10/2005

(Continued)

OTHER PUBLICATIONS

The International Search Report and the Written Opinion of the International Searching Authority (European Patent Office) issued Jul. 1, 2008.

(Continued)

Primary Examiner — Flemming Saether
(74) Attorney, Agent, or Firm — Levenfeld Pearlstein, LLC (57) ABSTRACT A twist-lock anchoring fastener comprises a head (700), a shaft (715), and a lance (720). The foot is adapted to penetrate through wallboard (105). The shaft length is approximately equal to the thickness of the wallboard so that when the foot lies on the back side (107) of the wallboard and the shaft is rotated, the foot is captured behind the wallboard, completing installation of the fastener. An optional footer (725) for the head contains raised lines (726) or bumps (727) or both to aid in seating the fastener on the wall. An optional wall plate assembly (1700) further strengthens the installation of the fastener by locally reducing pressure within the wallboard. In an alternative embodiment, the fastener comprises a wall anchor that accepts a pin (3200). In another alternative embodiment, the fastener is designed for installation in our prior-art wall anchor (100).

16 Claims, 9 Drawing Sheets

U.S. PATENT DOCUMENTS

| | | | |
|---|---|---|---|
| 3,897,035 A | | 7/1975 | Solo |
| 3,964,364 A | * | 6/1976 | Poe .................................. 411/43 |
| 3,983,779 A | | 10/1976 | Dimas |
| 4,022,100 A | | 5/1977 | Johnson |
| 4,181,061 A | | 1/1980 | McSherry |
| 4,196,883 A | | 4/1980 | Einhorn et al. |
| 4,233,881 A | | 11/1980 | Carrier |
| 4,274,324 A | | 6/1981 | Giannuzzi |
| 4,289,062 A | | 9/1981 | Schiefer |
| 4,322,194 A | | 3/1982 | Einhorn |
| 4,500,238 A | | 2/1985 | Vassiliou |
| 4,662,808 A | | 5/1987 | Camilleri |
| 4,902,179 A | | 2/1990 | Harker |
| 5,037,257 A | | 8/1991 | Kubic |
| 5,221,167 A | | 6/1993 | Girkin |
| 5,224,805 A | | 7/1993 | Moretti |
| 5,409,336 A | * | 4/1995 | Jericevich et al. .............. 411/41 |
| 5,447,005 A | | 9/1995 | Giannuzzi |
| 5,533,851 A | | 7/1996 | Remmers |
| 5,540,528 A | * | 7/1996 | Schmidt et al. ................. 411/55 |
| 5,586,364 A | * | 12/1996 | Ferrari et al. ................... 16/383 |
| 5,881,982 A | * | 3/1999 | Hollingsworth et al. 248/220.31 |
| 6,186,455 B1 | | 2/2001 | Hollingsworth et al. |
| 6,279,754 B1 | * | 8/2001 | Hoss et al. ....................... 211/26 |
| 6,435,789 B2 | | 8/2002 | Gaudron |
| 6,494,653 B2 | | 12/2002 | Remmers |
| 6,641,107 B1 | | 11/2003 | Janssen |
| 6,769,849 B2 | * | 8/2004 | Yoneoka .......................... 411/45 |
| 6,921,237 B2 | | 7/2005 | Vassiliou |
| 7,014,408 B2 | | 3/2006 | O'Banion et al. |
| 7,118,315 B2 | | 10/2006 | Huang |
| 7,850,408 B2 | * | 12/2010 | Ernst et al. .................... 411/344 |
| 2005/0076602 A1 | | 4/2005 | Routhier |

FOREIGN PATENT DOCUMENTS

| | | |
|---|---|---|
| WO | WO 00/25031 | 5/2000 |
| WO | 2007/005345 A | 1/2007 |

OTHER PUBLICATIONS

International Search Report dated Jul. 17, 2008 for PCT/US06/24649.

* cited by examiner

TWIST-LOCK ANCHORING FASTENER

CROSS-REFERENCE TO RELATED APPLICATIONS

This application makes reference to several aspects taught in our co-pending patent application Ser. No. 11/171,088, which is a Continuation-In-Part of Ser. No. 10/807,819, filed Mar. 24, 2004, now abandoned.

BACKGROUND

1. Field

The field is fastening devices, including devices that are used to anchor hooks and fasteners in hollow walls, ceilings, and panels comprising one or more layers.

2. Prior-Art Fasteners

Most walls and ceilings of residential and commercial structures have a hollow cavity construction, i.e., there is a hollow space behind the wall. The wall comprises a sheet of material, typically between 1 and 2.54 cm thick, affixed to a suitable frame which includes wood or metal framing members (studs or joists). These are typically spaced on 41 or 61 cm centers. Such sheet material is sold under various trademarks, such as SHEETROCK by United States Gypsum Co., Chicago, and is known generically as drywall, wallboard, plasterboard, and gypsum board. Another less-common wall and ceiling material with similar characteristics is plaster applied over a lath substrate. In the discussion below, the terms wall and ceiling are synonymous.

A variety of fasteners are commercially available for attaching, hanging, or securing objects such as pictures, minors, shelving, cabinetry, towel racks, handrails and other objects to a wall at a location other than over the area where a framing member is located.

Most prior-art anchoring fasteners can be divided into three general types: toggle, expansion, and penetration.

Toggle Fasteners

Toggle fasteners generally comprise two components. A first or anchor component has a spreading or tilting arm or arms and is inserted with the arms folded in into a drilled hole in the wall material. A second or activating component, typically a screw or pin, activates the anchor component after the anchor component is inserted. The activating component is inserted into the anchor component, causing its arm or arms to tilt or spread within the hollow space behind the wall, thereby locking the fastener firmly in place.

Nagel, in U.S. Pat. No. 2,916,235 (1959) discloses a fastener comprising an anchor component including a pivot-mounted arm at the end of a flared tube. A hole is drilled into the wall and the anchor component is fully inserted so that the flared end rests against the outer surface of the wall, preventing further insertion. The activating component is a screw. The screw, when inserted into the tube, forces the arm to rotate until its distal end contacts the inside of the wall. Turning of the screw causes it to wedge beneath the end of the arm nearest the pivot. This completes installation of the fastener.

While Nagle's device forms a secure fastener for walls of varying thickness, it suffers from several drawbacks. The fastener cannot be installed by simply hammering or screwing it into place. A hole must first be drilled. In order to permit the screw to wedge beneath the arm, the tube must have a substantially larger diameter than the screw. In turn, this requires a larger-than-desirable hole. Further, when fully wedged against the pivot-end of the arm, the screw does not seat in a position perpendicular to the wall. Thus the screw head does not lie flush with the wall, resulting in a less-than-perfect anchoring with a high-pressure contact at the top side of the screw head, and no contact at the bottom of the screw head. Finally, Nagel's device is somewhat complex, likely requiring manual assembly of the pivot joint. The several parts very likely render Nagel's device more expensive than simpler prior-art fasteners.

Dwyer, in U.S. Pat. No. 3,213,745 (1965), Johnson, in U.S. Pat. Nos. 3,431,813 (1969) and 4,022,100 (1977), McSherry, in U.S. Pat. No. 4,181,061 (1980), Schiefer, in U.S. Pat. No. 4,289,062 (1981), and Camilleri, in U.S. Pat. No. 4,662,808, all teach fasteners which operate on the same principle. An anchor component or front part (distal from the user) of the fastener is inserted into a pre-drilled hole in the wall. A flared proximal or rear portion of this component rests against the outer surface of the wall, preventing further insertion. An activating component, a screw, or pin, when inserted, causes two or more arms at the front part to spread in the space behind the wall, with the arms eventually resting against the inner surface of the wall. An object is then secured to the wall by hanging it on or affixing it with the activating component. As with Nagel, a pre-drilled hole in the wall is required. In many instances this causes the inside portion of the wall to crumble, weakening the wall at that point and limiting the weight of load supportable by the fastener.

Johnson '813 drives a rectangular fastener into a pre-drilled hole. The rest insert cylindrical fasteners into a pre-drilled hole. These fasteners all displace a significant amount of drywall material. This leaves an unsightly hole on removal of the fastener. More importantly, the size of such fasteners and the displacement of drywall material compromises the integrity of the wall.

Ellenberger, in U.S. Pat. No. 3,550,499 (1970), Moretti, in U.S. Pat. No. 5,224,805 (1993), and Remmers, in U.S. Pat. No. 6,494,653 (2002), teach fasteners with screw or pin-spread arms similar to those described above. However, the anchor component of these fasteners is hammered directly into the wall material, without requiring a pre-drilled hole. The activating component is then inserted to drive the arms apart, securing the fastener. Remmers further includes a gap or channel (FIG. 7) formed in his device. This gap can allow the tip to wobble and deflect as his fastener is hammered or screwed into a wall. Such motion can result in a larger-than desired hole, weakening the anchorage at barrel 54. The motion can also induce vibrations during insertion that cause the drywall to crumble and fail. Further, this wobbling motion and deflection can cause the anchor to enter the wall at an angle, causing the front and back sides of the wall to tear or crumble, degrading the integrity of the wall material. In addition, a hammer blow could cause his fastener to bend or crumple at the gap in the fastener. In this event, the fastener might not enter the wall at all. In addition, this fastener is cylindrical. When the fastener supports a load, the force is concentrated at and near the bottom of the cylinder. This places greater pressure on the wallboard beneath the fastener than if the fastener were flat and inserted horizontally into the wall. Finally, Remmers' hinges are located well away from the circumference of the activating pin and the ends of the ramps, 30 and 32 in FIGS. 3-6, are positioned so that arms 26*a* and 26*b* rotate less than 90 degrees when his fastener is installed. Because of this, arms 26*a* and 26B act as wedges that increase the pressure on the wallboard (FIG. 6). If the arms were able to rotate 90 degrees, their full length would bear against the inside of the wallboard, resulting in a stronger anchor.

Harker, in U.S. Pat. No. 4,902,179 (1990), teaches a drive-in anchor component structure with hinged flanges that expand circumferentially to engage the back side of the wall in response to insertion of a screw. In addition, when the screw is inserted, a longitudinally slit portion of the body expands within the hole created by the fastener. The expansion of his hinged flange adjacent the inside of wallboard 21 (FIG. 2) is limited at most to the diameter of pin or screw 60 (FIG. 2). Thus Harker's fastener forms a physical barrier of only limited extent on the backside of wallboard 21. In addition, if screw 60 is over-torqued, it will simply continue to rotate against the inner surface of the fastener, thereby reducing the fastener's effectiveness. Again, Harker's fastener is cylindrical and suffers from the same drawbacks as other cylindrical fasteners.

Gaudron, in U.S. Pat. No. 6,435,789 (2002), teaches a self-drilling fastener with a flanged, toggling anchor component. After the fastener drills its way through a wall, its flanged portion rests against the front side of the wall. The toggling portion is positioned behind the wall and pivots to a position parallel to the plane of the wall. Inserting and turning a screw draws the toggled portion toward the back side of the wall, where it rests, securing the fastener.

Three holding methods are common to the above prior-art fasteners. In the first method, toggles are inserted through the wall and then urged into contact with the back side of the wall by a screw. In the second method, the anchor component comprises pre-folded arms which, after full insertion of the fastener into the wall, are forced to spread against the back side of the wall by the anchor component. In the third method, flanges engage the back side of the wall while a slit portion expands to fill the hole through which the fastener is passed.

Expansion Fasteners

The other type of fasteners, expansion fasteners, are generally secured by increasing their diameter. Some comprise an anchor component which is hammered into a wall or inserted into a pre-drilled hole. The activating component is a pin or screw which is forced into a central, cylindrical cavity within the fastener, increasing its diameter. Still others have tangs and barbs which springably expand to resist pull-out of the fastener.

Karitzky, in U.S. Pat. No. 1,452,514 (1923), and Girkin, in U.S. Pat. No. 5,221,167 (1993), teach similar fasteners which are inserted into a drilled hole. A nail or screw is inserted into the fastener, forcing its diameter to increase, thus securing it in the hole. Girkin additionally includes a lock nut which forms part of the fastener.

In U.S. Pat. No. 4,322,194 (1982), Einhorn teaches a wall fastener which is hammered or otherwise driven into a wall. After insertion, a screw forces two or more arms apart, compressing the wall around the fastener.

In U.S. Pat. No. 3,983,779 (1976), Dimas teaches a nail with tangs. The nail is driven through roofing material into decking beneath by a hammer. Tangs on the nail prevent withdrawal of the nail and securely hold the roofing material in place on the decking.

Giannuzzi, in U.S. Pat. No. 5,447,005 (1995), and Vassiliou, in U.S. Pat. No. 4,500,238 (1985), teach an initially flat fastener that is driven into the wall. A screw is then threaded into the fastener, causing it to expand, partially within the wallboard material. Although these fasteners do minimal damage to wallboard material when they are inserted, they both spread upon activation, weakening the wallboard material by crushing it.

Expansion fasteners must exert sufficient expansion force to be secure, but must not fracture or crumble their host material. These fasteners are generally inappropriate for use in friable materials, such as drywall or gypsum board. They are limited to lighter loads as a result.

The above prior-art fasteners all employ an anchor having a section within the wall whose axis is perpendicular to the surface of the wall. Nagel, above, teaches a screw that passes through the normal cylindrical section at an angle in order to wedge against a member at the back of his structure. In all prior-art fasteners, the activating element such as a pin, nail, or screw, enters at the geometric axis of the wall-mounted section.

These prior-art fasteners suffer from significant disadvantages. Many do not have the ability to accept a variety of ready-made, pre-configured pins that can be inserted without tools. Other disadvantages include the need for drilling the wall for the fastener, difficulty in tightening properly since over-torquing the fastener or the screw often results in crumbling of the wallboard and failure of the fastening function, and an unsightly oversized hole when the fastener is removed from such an over-torqued condition. In addition, cylindrical fasteners concentrate the load force at the bottom of the fastener. This results in local pressures that are higher than experienced with flat fasteners of comparable holding capacity. These higher pressures can cause crumbling of the wallboard material, also known as "blowout". Some of these fastening systems are also non-removable or are difficult to remove without leaving a large, unsightly hole in the wall. In addition, expansion fasteners crush the friable drywall material, limiting the grip of the device in the wall. In addition, because of their large body volume, they displace more wallboard material making the wall weaker.

Penetration Fasteners

Fasteners that penetrate wallboard and similar materials are used in addition to simple nails and screws. For example, Janssen, in U.S. Pat. No. 6,641,107 (2003) teaches a hanging device comprising a push plate, an asymmetrical, flat lance with a barb on one side, and a hanger. The device is first oriented at 90 degrees from its normal, in-use position. Its lance is then placed against the outside of a hollow wall comprising a wallboard material. Manual pressure is applied to the push plate, causing the lance to penetrate the wall. When the lance is fully inserted with the push plate resting against the wall, the hanger is then rotated 90 degrees to its in-use position. In this position, the barb is retained at the inside surface of the wallboard, thus preventing removal of the fastener. A picture or other object can then be suspended from the fastener.

While this fastener is suitable for hanging pictures and the like, its asymmetrical lance can cause the position of the fastener to deviate from its desired position as the fastener penetrates the wallboard. In addition, the flat shaft of the lance crushes and locally displaces the wallboard material as the fastener is rotated from its insertion position to its in-use position, thereby weakening the wallboard in the vicinity of the fastener and reducing the load bearing capacity of the fastener.

Prior Art Fastener—Wall Anchor with Pins—FIGS.
1 Through 6

In our above co-pending U.S. patent application, which is incorporated by reference, we teach a different fastener.

Figure 1:
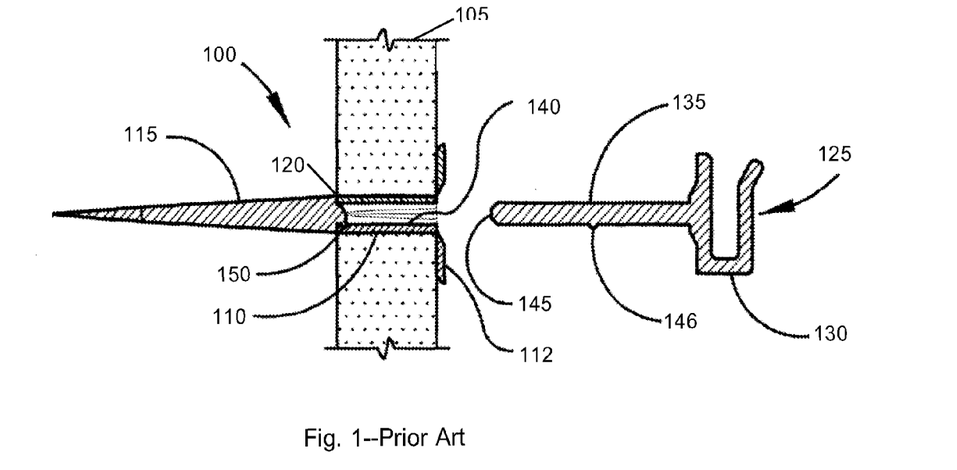
FIGS. 1 and 2 show cross-sectional side views of our prior-art fastener.

In one embodiment, shown in FIG. 1, wall anchor body 100 is pressed or hammered into position in a hollow wallboard 105. Body 100 comprises a front section 110 with a face 112, and a rear section 115 with a tip 116 that are joined by a hinge 120. A pin 125 with a head 130 in the form of a hook or other shape and a shaft 135 is inserted into an entry hole 140 in front section 100. In this embodiment, pin 140 has a tip 145, and a bump 146 on shaft 145. Body 100 has a detent 150 in front section 110. When fully inserted, face 112 of front section 110 is flush or nearly flush with the front side of wallboard 105.

Figure 2:
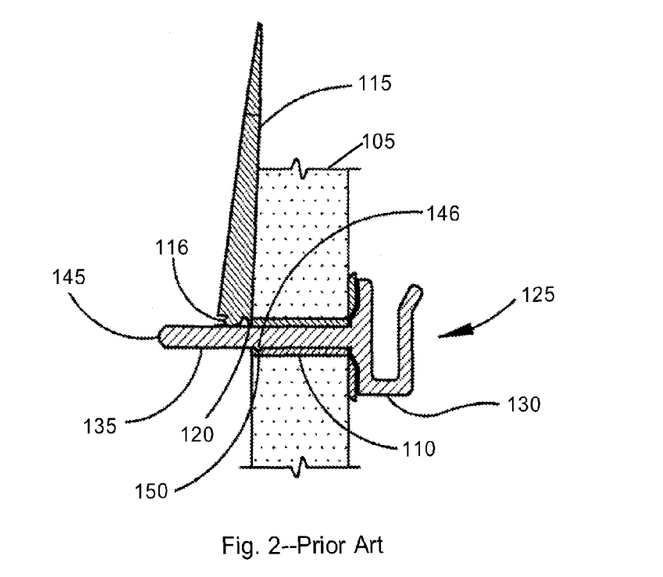

FIG. 2 shows pin 140 fully inserted into body 100. Tip 145 of pin 125 has dislodged rear section 115 and caused it to rotate about hinge 120, urging section 115 to rotate upward and into firm contact with the back side of wallboard 120, thereby locking body 100 in place. Bump 146 rests in detent 150, thereby securing pin 125 in body 100 and wallboard 105. Instead of pointing upward, rear section 115 can be arranged to point downward or another direction, if desired. Instead of a detent, screw threads or a frictional fit can be used to hold pin 125 in place.

Figure 3:
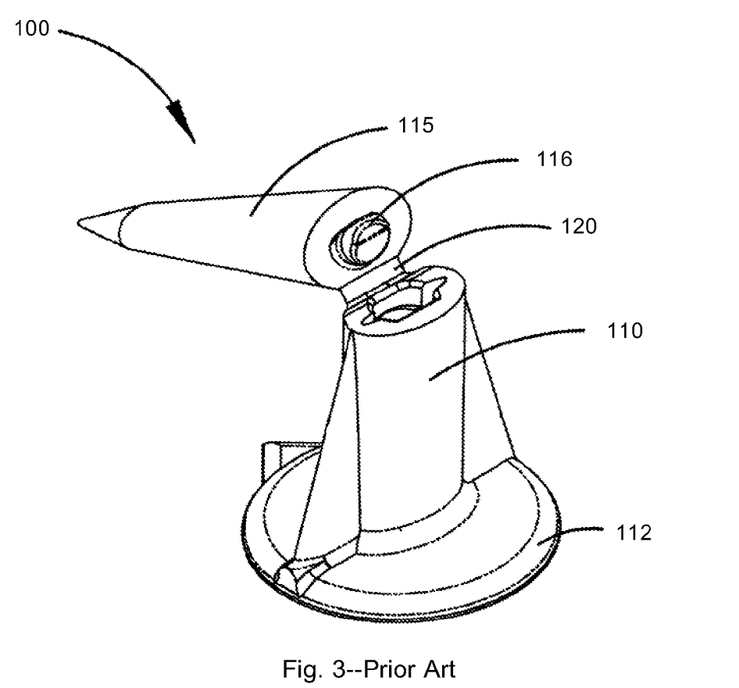
FIGS. 3 and 4 show perspective and cross-sectional views, respectively, of one embodiment of the fastener in FIGS. 1 and 2.
Figure 4:
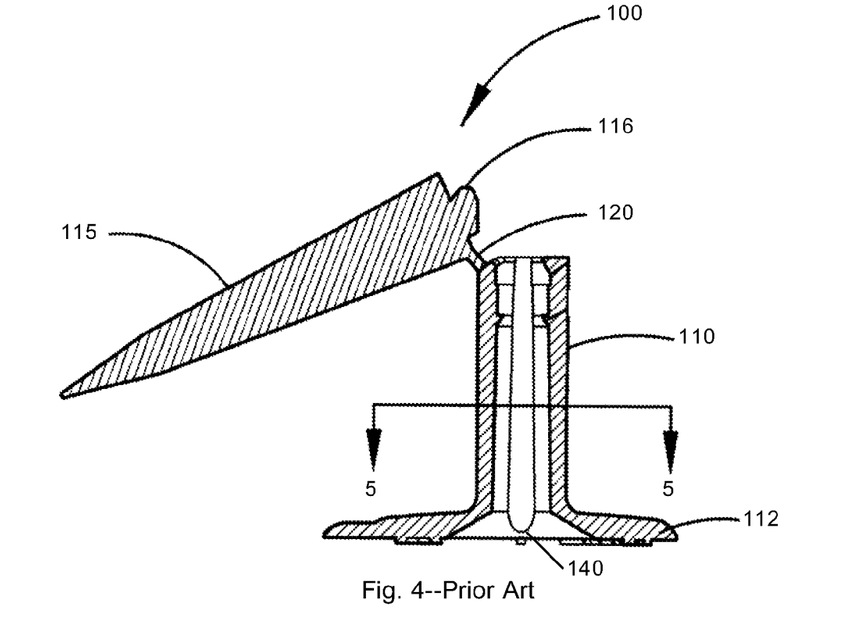
Figure 5A:
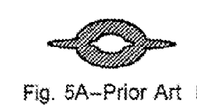
FIGS. 5A-5E show cross-sectional views of the front section of the fastener in FIGS. 1-4.
Figures 5B, 5C:
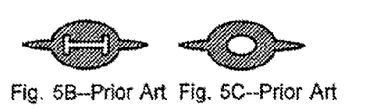
Figure 5D:
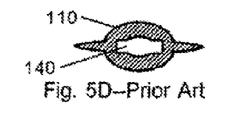
Figure 5E:
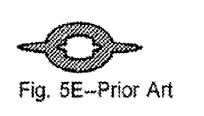

FIGS. 3 and 4 show perspective and cross-sectional views, respectively, of one embodiment of body 100. Front section 110 of body 100 has optional fins 150 to prevent rotation of body 100 after installation in wallboard 105 (FIG. 1). Entry hole 140 in front section 110 (FIG. 4) can have a variety of shapes, as shown in FIGS. 5A-5E.

Figure 6A:
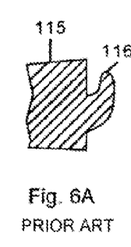
FIG. 6 shows a rear view and cross-sectional side view of part of the rear section of the fastener in FIGS. 1-5.
Figure 6B:
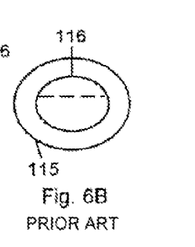

FIGS. 6A and 6B show detail cross-sectional and axial views, respectively, of rear section 115 and tip 116.

While our fastener of FIGS. 1 to 6 is an improvement on other fasteners, it has room for improvement in that it creates a hole that is larger than absolutely necessary to secure a fastener to a wall.

SUMMARY

In accordance with one preferred embodiment of one aspect, a hook with a base, a shaft, and a sharpened, radially-symmetrical, sharpened projection, or lance, are formed of a single piece of material. These components comprise a twist-lock anchor for mounting in hollow wall panels such as drywall, or in panels of wood, metal, plastics or other materials. In addition, the fastener can secure two or more panels together. The shaft separates and connects the hook and lance. The shaft's length is nominally the same as the wall thickness. To install, the hook is held perpendicular to the wall, and oriented at an angle other than the angle at which it is to be used. The plane containing the hook is parallel to the ground, for example. Next, the sharpened lance is urged to penetrate the wall material. In most cases the anchor can be inserted directly into the panel, either manually or with a tool, and with or without a pre-drilled hole. When the base of the fastener is in contact with the wall, the lance will have exited the wall material on the back side of the wall. Next, the hook is rotated to the final resting position at which it will be used. By virtue of the rotated position, the lance is captured on the back side of the wall and the lance and shaft hold the hook firmly in place. To remove the hook, the user simply rotates it to its initial insertion position and withdraws it from the wall. Damage to the wall caused by this kind of hook is reduced. A second embodiment employs a strengthening plate between the base and lance. A third embodiment comprises a lance and mounting plate combination into which a pin and hook combination is inserted. A fourth embodiment comprises an alternative mounting method for capturing and securing a hook.

| DRAWING FIG. REFERENCE NUMERALS ||||||
|---|---|---|---|---|---|
| 100 | Anchor | 105 | Wallboard | 106 | Wallboard front surface |
| 107 | Wallboard rear surface | 110 | Front section | 112 | Face |
| 115 | Rear section | 116 | Tip | 120 | Hinge |
| 125 | Pin | 130 | Head | 140 | Hole |
| 145 | Tip | 146 | Bump | 150 | Detent |
| 700 | Head | 705 | Plate | 710 | Gusset |
| 715 | Shaft | 716 | Shaft | 720 | Lance |
| 720' | Foot | 725 | Footer | 726 | Line |
| 727 | Bump | 1600 | Bearing plate | 1700 | Plate assembly |
| 1705 | Bearing plate | 1710 | Attachment | 2400 | Head |
| 2402 | Lumen | 2405 | Finger | 2410 | Slot |
| 2500 | Edge | 2503 | Lumen | 2505 | Opening |
| 3200 | Pin | 3202 | Head | 3203 | Gusset |
| 3205 | Shaft | 3210 | Tip | 3215 | Treatment |
| 3400 | Barb | 3405 | Bump | 3410 | Finger |
| 3411 | Thread | 4000 | Detent | | |

FIRST EMBODIMENT

Figure 7:
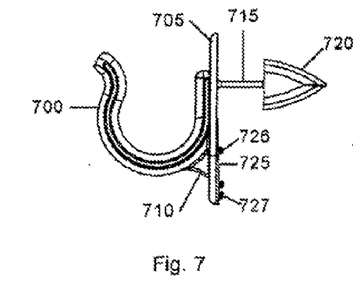
FIGS. 7 through 9 show a side, rear, and perspective front views of one aspect of one embodiment.
Figure 8:
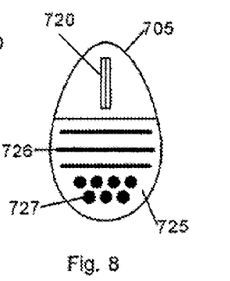
Figure 9:
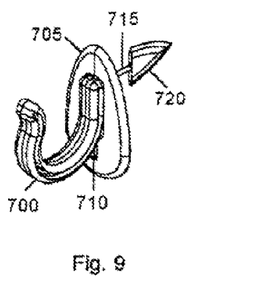

Twist-Lock Fastener—Description—FIGS. 7 Through 9

FIG. 7 is a side view of one aspect of a first embodiment of our anchoring fastener. A hook-shaped head 700 is joined to the front side of a plate 705. Head 700 is supported by an optional gusset 710. A round shaft 715 extends rearward from plate 705 and terminates in a sharpened, radially symmetrical lance 720.

Head 700 is generally used to hang objects on hollow walls or ceilings, or to secure objects to a plurality of panels that are held together by the anchoring fastener. Head 700 can take many other shapes, sizes, and uses, as shown below in connection with FIGS. 41 through 42F. In this example head 700 has a hook shape.

Plate 705 optionally incorporates a wedge-shaped region 725, called a footer, that extends from the bottom of plate 705 about half-way to the top. Footer 725 strengthens plate 705 and rests against wallboard 105 (FIG. 12) after installation, providing resistance against turning. In addition, footer 725 provides leverage against outside or front surface 106 of wall 105, and in combination with the anchorage in wall 105 and using tensile force in shaft 715, compresses wall material 105, resulting in a stronger anchoring. Footer 725 optionally incorporates raised areas comprising lines 726, bumps 727, or both (FIG. 8). These areas force plate 705 away from wall 105, thereby creating a pre-loading force on footer 725. This force prevents motion of head 700 during use, thereby reducing wear on both head 700 and wall 105.

FIG. 9 is a frontal perspective view of the embodiment of FIG. 7. The elements comprising the fastener are all made of a single piece of material such as plastic, reinforced plastic, metal, or even hard wood. In one embodiment plate 705 was 30 mm tall, and the remaining components scale as shown in FIGS. 7-9, except for the length of shaft 715. The length of shaft 715 is equal to or slightly greater than the thickness of wallboard 300 or any other wallboard into which the fastener is to be mounted, typically between about 13 and 16 mm. Other sizes are possible.

The cross-section of shaft 715 is round in this aspect.

FIRST EMBODIMENT

Operation—FIGS. 10 Through 15

Figure 10:
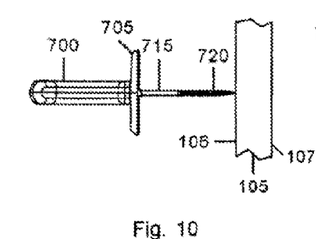
FIGS. 10 through 15 show steps in the installation of the embodiment of FIGS. 7-9.
Figure 11:
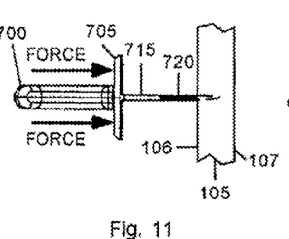
Figure 12:
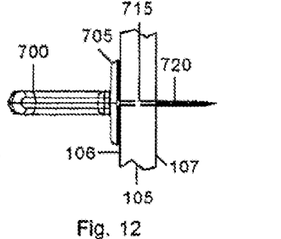

FIG. 10 shows a top view of the fastener just prior to insertion. In FIGS. 10 through 12, the fastener is held in a horizontal plane. In FIG. 10, the fastener is positioned at right angles to the front side 106 of a section of wallboard 105 in preparation for mounting on wallboard 105 that has front surface 106 and a rear surface 107.

In FIG. 11, force is applied to the front side of plate 705 in a direction parallel to shaft 715, thereby forcing the tip of lance 720 to penetrate wallboard 105. This force can be applied manually, or using a hammer or other tool.

In FIG. 12, the fastener is fully inserted into wallboard 105. The rear side of plate 705 is in contact with front surface 106. The length of shaft 715 is very nearly equal to the thickness of wallboard 105. Therefore lance 720 now rests entirely or very nearly beyond rear surface 107 of wallboard 105 and shaft 705 lies entirely within wallboard 105.

Figure 13:
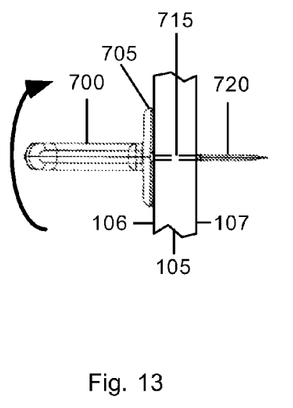
Figure 14:
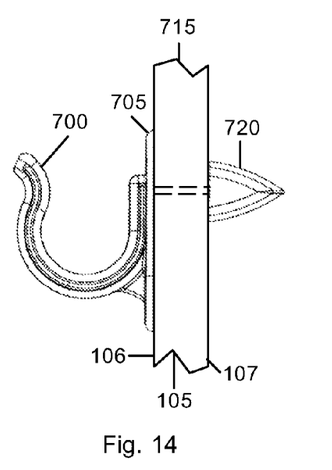

In FIG. 13, the fastener is rotated to the vertical position shown in FIG. 14. It is now fully anchored or installed and is ready for use. Objects (not shown) can be hung on head 700 and the anchor will resist pullout because it is locked as explained in the next paragraph.

Figure 15:
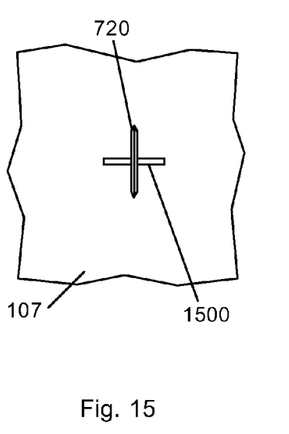

FIG. 15 shows a view from the inside of the wall, looking at back surface 107 of wallboard 105. As lance 720 penetrated wallboard 105, it created a slot 1500 in wallboard 105. As the fastener was rotated to the vertical position, lance 720 was also rotated to the position shown, thereby locking the fastener in place in wallboard 105.

The fastener is removed by rotating it to the orientation it had during insertion of lance 720 (FIG. 12) and withdrawing it from the wall. Although a rotation of 90 degrees is shown in this example, any angle between approximately 10 degrees and 80 degrees will suffice to lock the fastener in place.

SECOND EMBODIMENT

Twist-Lock Fastener with Support Plate—Description and Operation—FIGS. 16 Through 19

Figure 16A:
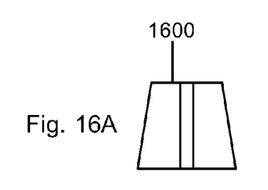
FIGS. 16 and 17 show a plate assembly according to another aspect of the embodiment of FIGS. 7-15.
Figure 16B:
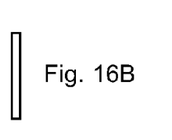
Figure 16C:
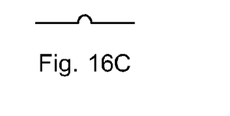
Figure 17:
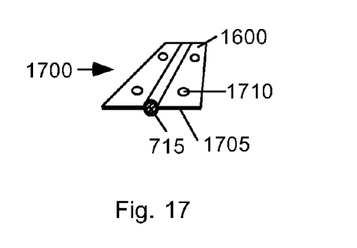

A bearing plate assembly 1700 (FIG. 17) is added to the previous embodiment to provide additional strength by distributing the force applied to wallboard 105 over an area that is greater than that of shaft 715 alone. FIGS. 16A, 16B, and 16C respectively show top, side, and end views of one component 1600 of assembly 1700. Plate 1600 is roughly trapezoidal in shape and has a raised ridge extending between its two parallel sides. Bearing plate assembly 1700 comprises a top portion or plate 1600 and a similar bottom portion or plate 1705 (FIG. 17). The two portions are secured face-to-face with their longitudinal grooves facing each other to form a cylinder which extends around shaft 715 of the fastener shown above in FIGS. 7 through 15. Portions 1600 and 1705 are secured together by one or more attachments 1710 such as spot-welds, swaged areas, rivets, or an adhesive placed between the halves. In any case, the cylinder is wide enough to allow shaft 715 to rotate inside assembly 1700.

Figure 18:
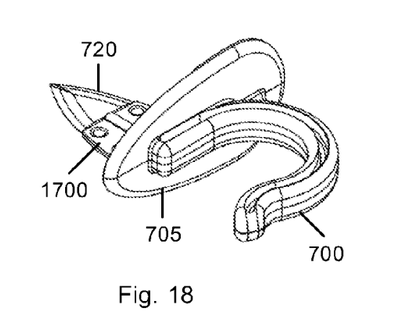
FIGS. 18 through 23 show steps in the installation of the fastener incorporating the plate assembly of FIGS. 16 and 17.

FIG. 18 shows plate assembly 1700 in place on shaft 715 of the fastener. Plate assembly 1700 covers substantially all of shaft 715, extending from the front side of lance 720 to the back side of plate 705. The relative positions of assembly 1700 and the fastener are shown prior to insertion in wallboard 105 (FIG. 19).

Figure 19:
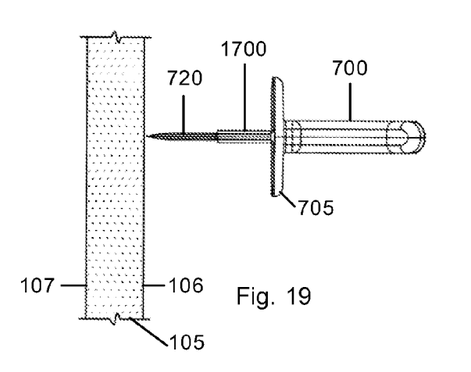
Figure 20:
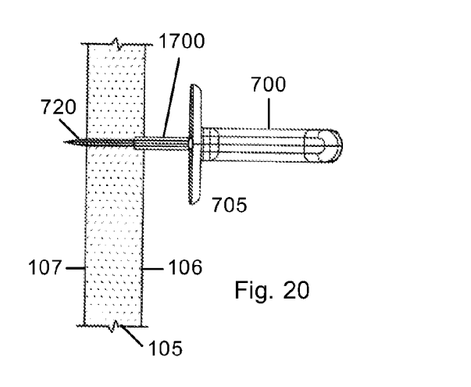
Figure 21:
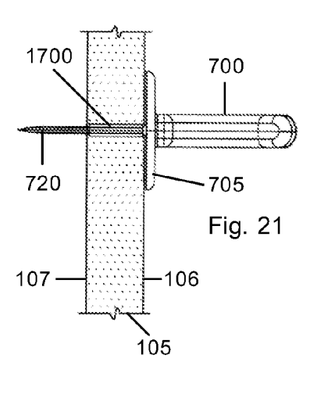

In use, the fastener is oriented horizontally as shown in FIG. 19. The tip of lance 720 is pressed into the front side 106 of wallboard 105. FIG. 20 shows the fastener partially installed. FIG. 21 shows the fastener fully installed in wallboard 105. The plate assembly does not hinder insertion of the fastener because lance 720 precedes it into wallboard 105 and the assembly displaces only a small additional amount of wallboard material.

Wallboard 105 has a thickness equal to the length of plate 1700 along shaft 715. When lance 720 has penetrated to the back side of wallboard 105, the inside of plate 705 is in contact with front side 106 of wallboard 105 and plate 1700 lies fully within wallboard 105.

Figure 22:
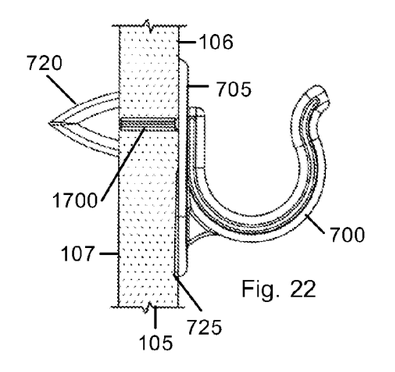

In FIG. 22, the fastener has been rotated 90 degrees counter-clockwise (CCW), thereby completing installation. Plate assembly 1700 remains in a horizontal orientation while shaft 715 rotates within the plate assembly. In this orientation, the load on shaft 715 is distributed over the area of plate assembly 1700. This spreads the force and thereby reduces the pressure within wallboard 105, resulting in a stronger anchoring of the fastener.

Figure 23:
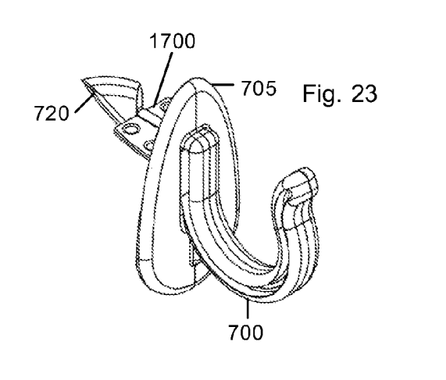

FIG. 23 is a frontal perspective view showing the relative positions of lance 720 and plate assembly 1700 after installation.

THIRD EMBODIMENT

Twist-Lock Wall Anchor with Pin—Description and Operation—FIGS. 24 Through 34

In this embodiment a twist-lock wall anchor is first inserted into a wall, and locked into place. Then a pin for use in holding objects is inserted into the anchor.

Figure 24:
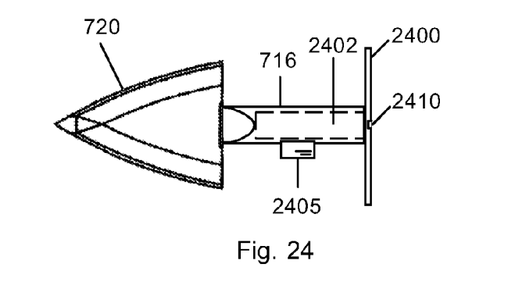
FIGS. 24 through 31 show another embodiment comprising a twist-lock anchor.
Figure 25:
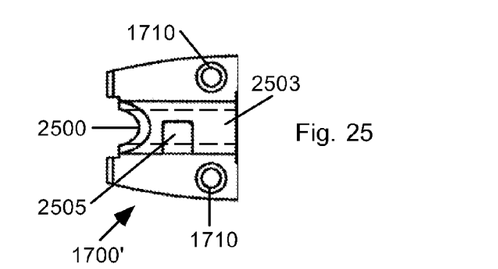

Sharpened lance 720 is connected to a hollow shaft 716 which has a lumen 2402 (FIGS. 24 and 25). An optional finger tab 2405 extends from the outside of shaft 716. A flat head 2400 is connected to the other end of shaft 716. Lance 720, shaft 716, and head 2400 are formed of a single piece.

A plate assembly 1700' is similar to plate 1700 (FIG. 17), but includes an indented back edge 2500 and a rectangular opening 2505. A second lumen 2503 formed between the top and bottom portions of plate assembly 1700' are assembled around shaft 716 and held in place by attachments 1710, as described above. This assembly comprises the wall anchor.

Finger 2405 extending from shaft 715 (FIG. 24) is arranged to project through opening 2505 (FIG. 25) when plate assembly 1700' is secured around shaft 716. As above, shaft 716 is able to rotate freely within lumen 2503 of plate assembly 1700', except the amount of rotation is limited to about 90 degrees as finger 2405 encounters the edges of opening 2505. Alternatively, finger 2405 can be eliminated. In this case, after insertion the fastener will be secured when shaft 716 is rotated between about 5 and 180 degrees, with 90 degrees being optimal.

Head 2400 is supplied with a slot 2410 to facilitate rotation of head 2400, shaft 716, and head 2400. The length of shaft 716 is approximately equal to the thickness of the wallboard into which the fastener is to be mounted.

Figure 26:
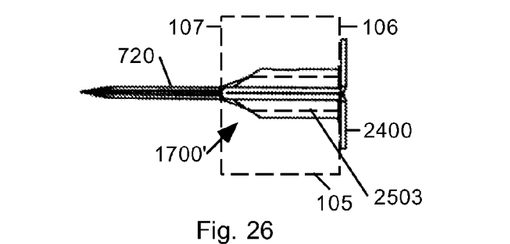
Figure 27:
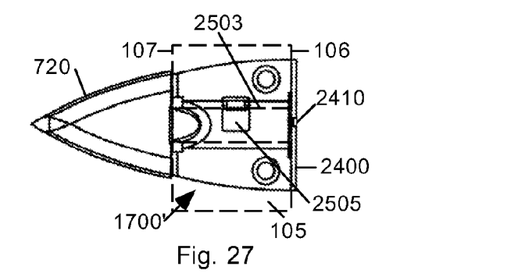
Figure 28A:
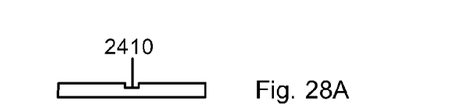
Figure 28B:
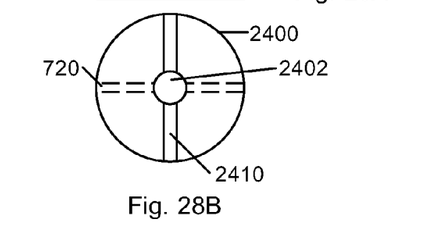
Figure 29:
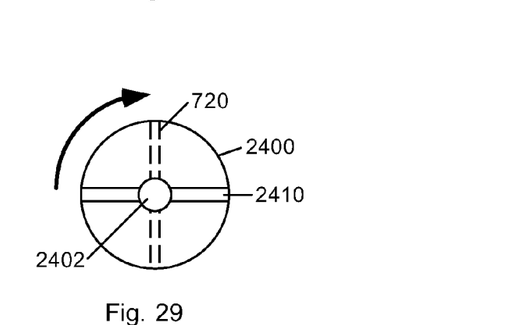

The present embodiment is installed into wallboard in the same manner as the previous embodiment. FIGS. 26 and 27 show side and top views, respectively, of an assembled fastener after insertion into wallboard 105. After the fastener is inserted, but not yet rotated, lance 720 is oriented horizontally, as indicated by the dashed lines in FIG. 28B. Next, head 2400 is rotated, typically using a screwdriver inserted into slot 2410. The orientation of lance 720 is now vertical, as shown in FIG. 29. In any case, head 2400, and therefore lance 720, are rotated more than five and less than 90 degrees. Further rotation of the lance, shaft, and front piece assembly is prevented by tab 2405 (FIG. 24) as it encounters the top edge of opening 2505 (FIG. 25). Tab 2405 creates a stop point for the turning of head 2400. This stop point positions lance 720 at an optimum angle of 90 degrees with respect to the insertion point in wall 105 for maximum strength. While a single slot 2410 is shown in head, an additional slot (not shown) can be added at right angles to slot 2410 to accommodate a Phillips screwdriver. Alternatively, or in combination, the front end of hole 2402 can have a hexagonal shape to accommodate an Allen wrench. Instead of using a screwdriver or wrench to rotate head 2400, lance 720 can be rotated by a pin or screw after it is inserted in bore 2402.

Figure 30:
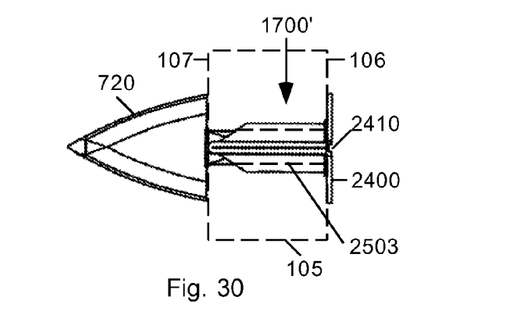
Figure 31:
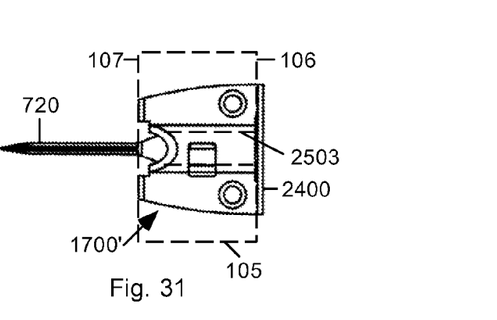

FIGS. 30 and 31 show side and top views, respectively, of the fastener after installation. Lance 720 has been rotated to a position that prevents pull-out of the fastener. Tab 2405 is in contact with the top edge of slot 2505 (FIG. 31). Plate assembly 1700' is horizontal and provides added strength and load-bearing capability for the fastener.

Figures 32, 33:
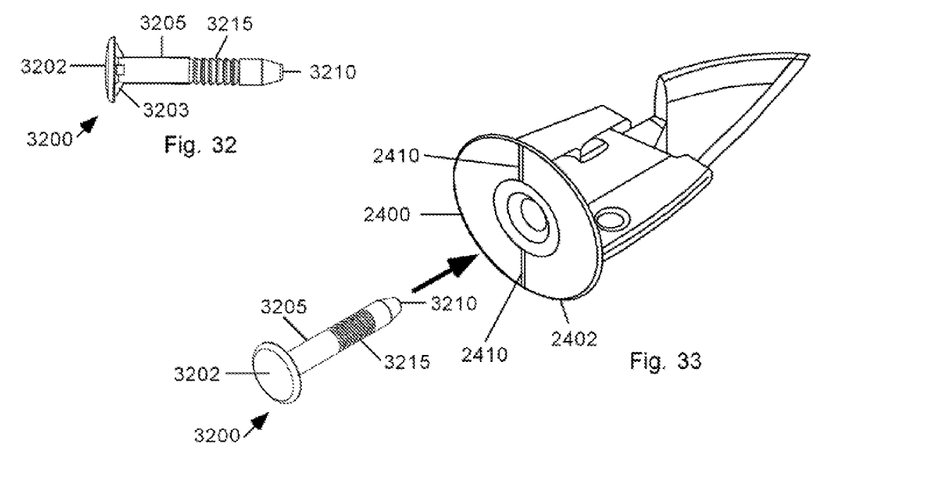
FIGS. 32 through 34 show installation of a pin in the embodiment shown in FIGS. 24-31.

A side view of a pin 3200 for holding objects after insertion in the anchor of FIGS. 24-31 is shown in FIG. 32. Pin 3200 has a head 3202 connected to a shaft 3205 which has a tip 3210. Optional gussets or circumferential ribs 3203 between head 3202 and shaft 3205 provide extra strength. The length of shaft 3205 is equal to or slightly less than the length of hole 2402 (FIG. 24) in shaft 716. In use, pin 3200 is inserted into and secured within hole 2402 in shaft 716 of the twist-lock wall anchor, as shown in FIG. 33. The head of pin 3200 can comprise a variety of shapes, including hooks.

Shaft 3205 has various surface treatments 3215 including, but not limited to ridges and barbs. These serve to increase the pull-out force required to remove pin 3200 from the anchor. Some alternative treatments are shown in FIGS. 34A through 34E.

For example, ridges 3215 have an outside diameter that is slightly larger than that of shaft 3205 so as to forcibly engage the bore of hole 2402 after pin 3200 is urged into the bore.

Figure 34A:
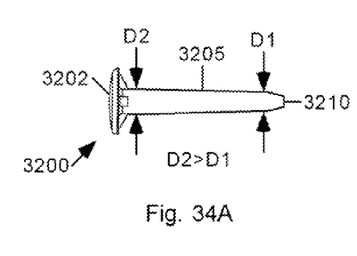

An alternative pin design is shown in FIG. 34A. Shaft 3205 varies in diameter, starting at the tip end 3210 with a diameter equal to or slightly less than the diameter of hole 2402 in shaft 715 (FIG. 24). The diameter of shaft 3205 near head 3202 is very slightly greater than the diameter of hole 2402, resulting in a tight friction fit between the two when pin 3200 is urged into the anchor.

Figure 34B:
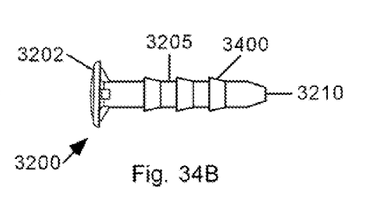

FIG. 34B shows shaft 3205 with or more barbs 3400. The diameter of shaft 3205 is approximately equal to that of hole 2402. The outer diameter of barb 3400 is slightly greater than that of shaft 3205, resulting in a tight, frictional fit when pin 3200 is inserted into hole 2402.

Figure 34C:
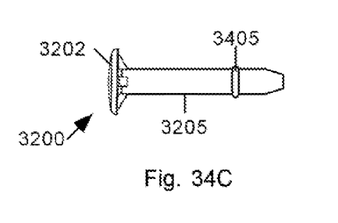

FIG. 34C shows shaft 3205 with one or more bumps 3405. The diameter of shaft 3205 is approximately equal to that of hole 2402, while the outer diameter of bump 3405 is slightly greater. Again, a tight friction fit results between bump 3405 and the bore of hole 2402.

Figure 34D:
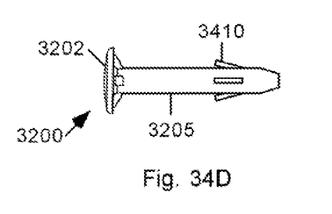

FIG. 34D shows shaft 3205 with one or more spring-loaded fingers 3410. The diameter of shaft 3205 is approximately equal to that of hole 2402. When pin 3200 is inserted into hole 2402, spring fingers 3410 are forced inward on shaft 3205. Fingers 3410 exert a spring force on the bore of hole 2402, again resulting in a tight fit that resists removal of pin 3200.

Figure 34E:
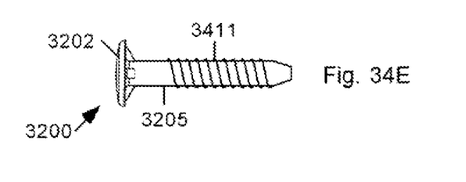

FIG. 34E shows shaft 3205 with threads 3411 which secure pin 3200 in the bore of hole 2402.

If additional pull-out resistance is required, pin 3200 can be glued into hole 2402.

FOURTH EMBODIMENT

Wall Anchor with Twist-Lock Fastener—Description and Operation—FIGS. 35 Through 40

Figure 35:
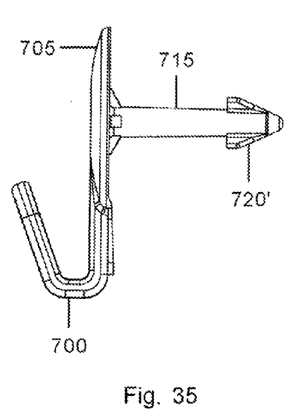
FIGS. 35 through 37 show one aspect of a twist-lock fastener for insertion into our prior-art wall anchor.
Figure 36:
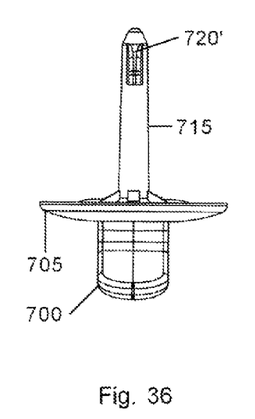
Figure 37:
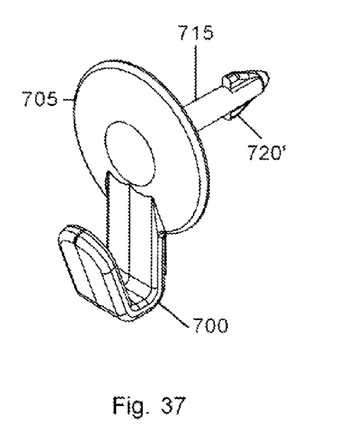
Figure 38:
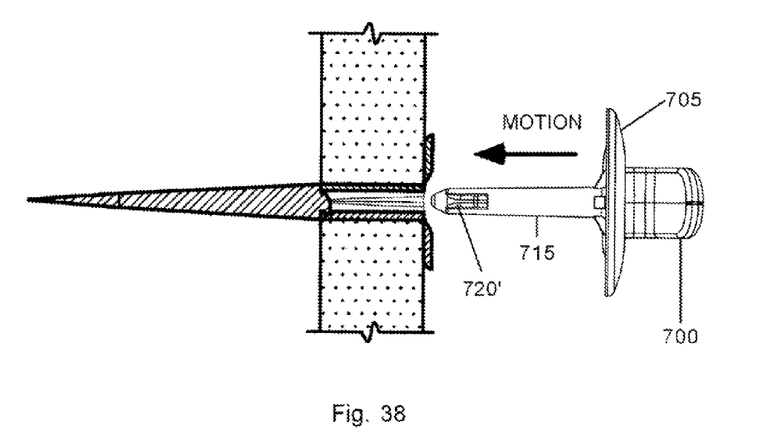
FIGS. 38 through 40 illustrate installation of the fastener of FIGS. 35-37 into our prior-art wall anchor.

FIGS. 35 through 37 show side, top, and frontal perspective views, respectively, of a twist-lock fastener designed for use in our prior wall anchor of FIGS. 1 to 5 in lieu of pins incorporating threads, ratchets, and serrations along their shafts. The fastener comprises a head 700 with a plate 705, a shaft 715, and a foot 720'. In this embodiment, foot 720' need not be sharpened, as was the case in the first and second embodiments.

The fastener in this embodiment is inserted into the prior-art wall anchor shown in FIGS. 1 through 5. The oval shape of entry hole 140 in front portion 110, shown in FIG. 5D, is suitable for use with the twist-lock fastener, although other shapes will work as well. FIG. 35 shows a side view of anchor 100 fully inserted into wallboard 105. The twist-lock fastener is then held in a horizontal position and fully inserted into anchor 100. In the case of the pin-style fastener, discussed above in connection with the previous embodiment, the oval shape of the bore in the prior-art anchor acts to positively grip and retain the serrated pin of FIG. 32, or any of the other pins shown in FIGS. 34A-34E. In addition, the external, horizontal fins of the prior-art anchor help to maintain the oval shape of the anchor and bore by acting as a brace to the anchor walls that comprise the oval shape for the bore, thereby ensuring entrapment of the inserted pin.

Figure 39:
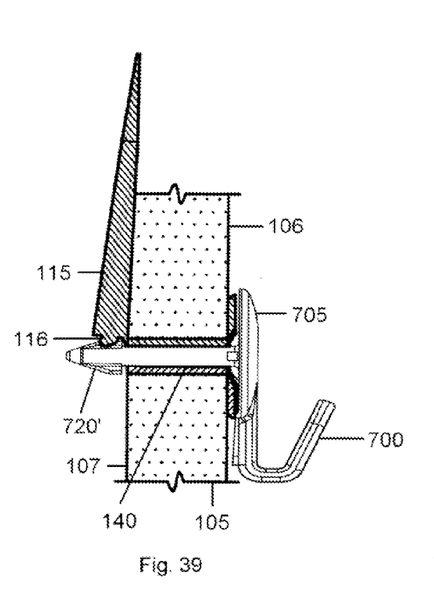
Figure 40:
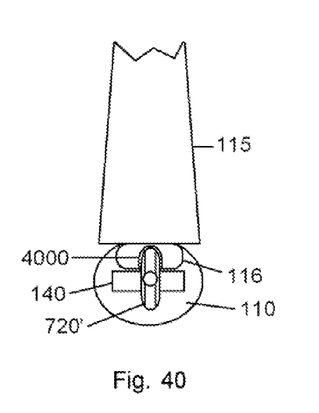

FIG. 39 shows a side view of the fastener fully inserted into anchor 100 and rotated 90 degrees to its locked position. FIG. 40 shows a view from the rear looking forward. A detent 4000 has been molded into tip 116. As the fastener is rotated to its vertical position, foot 720' rotates into detent 4000, thereby locking the fastener in place in wall anchor 100. Although use of a non-sharpened foot is shown, a sharpened foot can also be used, if desired.

ALL EMBODIMENTS

Figure 41:
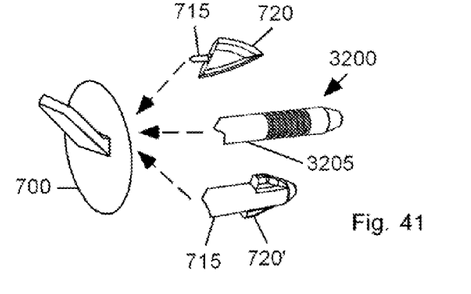
FIG. 41 shows a common head piece useful with all aspects of the twist-lock fastener embodiments.
Figure 42A:
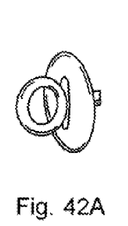
FIG. 42 shows various head designs for use with any or all of the twist-lock fastener embodiments.
Figure 42B:
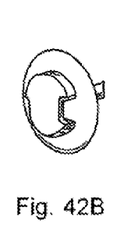
Figure 42C:
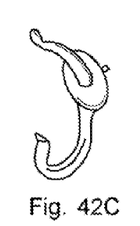
Figure 42D:
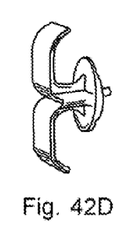
Figure 42E:
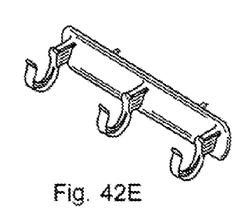
Figure 42F:
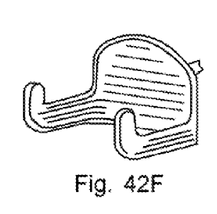

Various Heads—FIGS. 41 Through 42*f*

A variety of hooks and other fasteners can be used in place of head 700 of the twist-lock fastener, and of head 3202 of pin 3200. FIG. 41 shows a head 700 and sharpened tip with shaft 715, not-sharpened tip 720' with shaft 715, and pin 3200 with shaft 3205. Any of shafts 715 or 3205 can be joined with the single hook of head 700 to form a usable fastener. FIGS. 42A through 42F show a loop, a cable tie fastener, a coat hook, a double hook clamp, a ganged hook set, and a tool hook.

CONCLUSION, RAMIFICATIONS, AND SCOPE

The embodiments shown of our anchoring twist-lock fastener provide several useful and advantageous features. Minimal damage is done to wallboard, yet a strong fastener is provided. In addition, the fastener is easily removed without further damaging the wallboard. In one embodiment, the twist-lock anchor is adapted for use with our prior-art wall anchor. Each fastener can accommodate a variety of pins, and hooks of various sizes.

While the above description contains many specificities, these should not be considered limiting but merely exemplary. Many variations and ramifications are possible. For example, instead of being pushed or hammered into the wall, our fasteners can be installed using a powered mechanism such as a spring-loaded gun. Our fasteners can be supplied in a variety of colors, textures, and materials. Their size can vary from small, on the order of one centimeter overall, to many centimeters. Instead of being used in wallboard, they can be used in sheet metal or wood. They can be used to bind together two or more sheets of metal, wood, wallboard, or other materials of varying thicknesses. Instead of turning the head counter-clockwise to install the fastener, its components can be moved to permit turning the head clockwise for installation. The lance can be made of a flexible material so that the lance deforms as the shaft is twisted, thereby accommodating wall thicknesses slightly greater than the shaft length. Instead of two layers, plate 1700 can be a single layer with one or more straps encircling the shaft.

While the present system employs elements which are well known to those skilled in the art of wall anchor design, it combines these elements in a novel way which produces a new result not heretofore discovered. Accordingly the scope of this invention should be determined, not by the embodiments illustrated, but by the appended claims and their legal equivalents.

The invention claimed is:

1. An anchoring fastener system for a wall comprising:
   a plate with front and rear surfaces,
   a head attached to said rear surface of said plate, wherein said head is selected from the group consisting of hooks, loops, and clamps;
   a shaft with proximal and distal ends, said proximal end being attached to said front surface of said plate, and wherein said head is attached to said rear surface of said plate at a position radially offset from a major axis of said shaft,
   a foot attached to said distal end of said shaft, wherein said foot extends transversely from said shaft, and
   a wall anchor including first and second sections coupled together by a connecting element, and wherein said second section terminates in a single sharpened tip, said wall anchor having initial and final conditions and arranged to receive said shaft and said foot,
   said wall anchor being arranged so that when installed in said wall in said first condition with said first and second sections of said wall anchor being collinear, and said foot and said shaft are inserted into said anchor and rotated, said anchor will assume said final condition with said second section rotated about said connecting element away from said first section and secured against an inside surface of said wall,
   whereupon when said head is turned, said foot urges said wall anchor into said final condition, thereby securing said anchoring fastener to said wall.

2. The system of claim 1 wherein said anchor contains a detent so that said foot engages said detent in said anchor upon insertion of said foot and rotation of said head.

3. The system of claim 1 wherein said plate, head, shaft, and foot are made from a material selected from the group consisting of plastic, metal, and wood.

4. The system of claim 1 wherein said first section of said wall anchor includes an opening defined therethrough and a notch defined in said opening and said second section of said wall anchor includes a finger disposed on a proximal portion thereof, wherein said notch is adapted to receive said finger of said second section to maintain said wall anchor in said first condition.

5. The system of claim 4 wherein said opening defined through said first section of said wall anchor has a non-circular cross-section.

6. The system of claim 1 wherein said wall anchor includes fins extending outwardly therefrom configured to prevent rotation of said wall anchor when installed in said wall.

7. The system of claim 1 wherein said first and second sections of said wall anchor have elliptical cross-sections.

8. The system of claim 1 wherein said connecting element is a hinge.

9. The system of claim 1 wherein said foot has an arrowhead shape.

10. The method of claim 1 wherein said anchoring fastener includes fins extending outwardly therefrom configured to prevent rotation of said anchoring fastener when inserted into said wall.

11. A method for anchoring an object to a wall, comprising:
   providing an anchoring fastener having a distal section and a proximal section, wherein said distal section terminates in a single sharpened tip, said sections being initially collinear,
   inserting said fastener into a wall with a hollow volume therebehind,
   providing a pin with a head, wherein said head is selected from the group consisting of hooks, loops, and clamps, a shaft and a foot extending transversely from said shaft and of sufficient size to cause said distal section to rotate, wherein said head is attached to said rear surface of said plate at a position radially offset from a major axis of said shaft, said fastener being arranged so that upon insertion of said pin into said fastener, said foot of said pin will activate said fastener by causing said distal section to rotate to an angle with respect to said proximal section,
   rotating said pin so that said foot rests firmly against said distal section of said anchor, thereby securing said fastener and said pin in said wall.

12. The method of claim 11 wherein said first proximal section of said anchoring fastener includes an opening defined therethrough and a notch defined in said opening and said distal section of said anchoring fastener includes a finger disposed on a proximal portion thereof, wherein said notch is adapted to receive said finger of said distal section to maintain said wall anchor in said initial collinear arrangement during said step of inserting said fastener into said wall.

13. The method of claim 12 wherein said opening defined through said proximal section of said anchoring fastener has a non-circular cross-section.

14. The method of claim 11 wherein said distal and proximal sections of said anchoring fastener have elliptical cross-sections.

15. The method of claim 11 wherein said distal and proximal sections of said anchoring fastener are coupled together by a hinge.

16. The method of claim 11 wherein said foot has an arrowhead shape.

* * * * *